(12) United States Patent
Yagi et al.

(10) Patent No.: US 12,438,209 B2
(45) Date of Patent: Oct. 7, 2025

(54) RECOVERY OF NICKEL AND COBALT FROM BLACK MASS

(71) Applicant: Umicore, Brussels (BE)

(72) Inventors: Ryohei Yagi, Olen (BE); Lennart Scheunis, Olen (BE)

(73) Assignee: UMICORE, Brussels (BE)

( * ) Notice: Subject to any disclaimer, the term of this patent is extended or adjusted under 35 U.S.C. 154(b) by 630 days.

(21) Appl. No.: 17/815,982

(22) Filed: Jul. 29, 2022

(65) Prior Publication Data

US 2023/0369667 A1    Nov. 16, 2023

Related U.S. Application Data

(63) Continuation-in-part of application No. 17/743,507, filed on May 13, 2022, now Pat. No. 11,661,638.

(30) Foreign Application Priority Data

May 13, 2022  (WO) ................. PCT/EP2022/063010

(51) Int. Cl.

| | |
|---|---|
| *H01M 10/54* | (2006.01) |
| *C22B 1/00* | (2006.01) |
| *C22B 7/00* | (2006.01) |
| *C22B 7/04* | (2006.01) |
| *C22B 23/02* | (2006.01) |
| *H01M 10/0525* | (2010.01) |

(52) U.S. Cl.
CPC .............. *H01M 10/54* (2013.01); *C22B 1/005* (2013.01); *C22B 7/004* (2013.01); *C22B 7/04* (2013.01); *H01M 10/0525* (2013.01); *C22B 23/028* (2013.01)

(58) Field of Classification Search
None
See application file for complete search history.

(56) References Cited

U.S. PATENT DOCUMENTS

| | | | |
|---|---|---|---|
| 3,043,681 A | 7/1962 | Udy et al. | |
| 7,169,206 B2 | 1/2007 | Cheret et al. | |
| 10,294,546 B2 | 5/2019 | Takahashi et al. | |
| 2014/0060250 A1 | 3/2014 | Takahashi et al. | |
| 2017/0229744 A1 | 8/2017 | Heulens et al. | |
| 2019/0032171 A1 | 1/2019 | Quix et al. | |
| 2019/0376159 A1 | 12/2019 | Suetens et al. | |
| 2021/0328283 A1 | 10/2021 | Yamashita et al. | |
| 2022/0017990 A1 | 1/2022 | Scheunis et al. | |

FOREIGN PATENT DOCUMENTS

| | | | | |
|---|---|---|---|---|
| AU | 3278378 A | 5/1978 | | |
| CN | 1046191 A | 10/1990 | | |
| CN | 103924088 A | 7/2014 | | |
| CN | 104674013 A | 6/2015 | | |
| CN | 104789778 A | 7/2015 | | |
| CN | 105838895 A | 8/2016 | | |
| CN | 110199038 A | 9/2019 | | |
| CN | 111118296 A | 5/2020 | | |
| CN | 111129632 A | 5/2020 | | |
| CN | 113166846 A | 7/2021 | | |
| EP | 3269832 A1 | * 1/2018 | ............. | C22B 23/02 |
| JP | 2012193424 A | 10/2012 | | |
| JP | 2019502826 A | 1/2019 | | |
| JP | 2021031760 A | 3/2021 | | |
| JP | 2021031762 A | 3/2021 | | |
| WO | 2012140951 A1 | 10/2012 | | |
| WO | 13080266 A1 | 6/2013 | | |
| WO | 2016141875 A1 | 9/2016 | | |
| WO | 2017121663 A1 | 7/2017 | | |
| WO | 2020013294 A1 | 1/2020 | | |

OTHER PUBLICATIONS

USPTO; Non-Final Office Action for U.S. Appl. No. 17/743,507 dated Sep. 12, 2022, 8 pages.
JPO: Notice of Reasons for Rejection mailed May 27, 2024 for Japanese Patent Application No. 2023-572896, 5 pages.
Elwert, T., et al., "Phase composition of high lithium slags from the recycling of lithium-ion batteries", World of Metallurgy-Erzmetall, vol. 65, No. 3, 2012, 9 pages.
Hu, X., et al., "Recovery of Co, Ni, Mn, and Li from Li-ion batteries by smelting reduction-Part Ii: A pilot-scale demonstration", Journal of Power Sources, vol. 483, 2021, 12 pages.
Vest, M., et al., "Slag design for lithium recovery from spent batteries", Int. Work. Met. Interact., vol. 9, No. 93, 2010, pp. 93-106.
Wittkowski, A., et al., "Speciation of Manganese in a Synthetic Recycling Slag Relevant for Lithium Recycling from Lithium-Ion Batteries", Metals, vol. 11, No. 2, Jan. 2021, 22 pages.
China National Intellectual Property Administration: Notification of First Office Action for corresponding Chinese Application No. 202380040221.9, mailed May 14, 2025, 6 pages.

* cited by examiner

*Primary Examiner* — Ricardo D Morales
(74) *Attorney, Agent, or Firm* — NK Patent Law

(57) ABSTRACT

The present invention lies in the field of pyrometallurgy and discloses a process and a slag suitable for the recovery of Ni and Co from Li-ion batteries or their waste, particularly from Black Mass.
The slag composition is defined according to:
  25%<MnO<70%;
  $Al_2O_3$+0.5 MnO<45%
  $SiO_2$>5%;
  $Li_2O$>1%;
  MnO+$Li_2O$+$Al_2O_3$+CaO+$SiO_2$+FeO+MgO+$P_2O_5$>90%; and,
  wherein (CaO+2 $Li_2O$+0.4 MnO)/$SiO_2$≥2.0.
This composition is particularly adapted to limit or avoid the wear or corrosion of furnaces lined with magnesia-bearing refractory bricks.

26 Claims, No Drawings

RECOVERY OF NICKEL AND COBALT FROM BLACK MASS

CROSS-REFERENCE TO RELATED APPLICATIONS

This application is a continuation in part of U.S. Non-Provisional patent application Ser. No. 17/743,507, filed on May 13, 2022, and claims the benefit of International Patent Application No. PCT/EP2022/063010, filed on May 13, 2022, the entire contents of which are all hereby incorporated herein by reference.

The present invention lies in the field of pyrometallurgy and concerns the recovery of Ni and Co from Li-ion batteries or their waste, more particularly from Black Mass.

Electric vehicles have seen unprecedented growth in recent years, among others driven by new legislation in Europe and China, designed to gradually reduce the $CO_2$ footprint of car fleets and to limit the air pollution in cities. This growth is expected to continue during the next decades. The adoption of electric vehicles greatly depends on the performance of batteries used to store electric energy. To obtain the highest energy density while keeping the costs under control, rechargeable Li-ion batteries are a preferred choice. Many of these batteries contain cathodes based on the transition metals Ni, Mn and Co, and are therefore also known as NMC batteries. With the growth of the electric mobility market, the demand for these metals is also expected to increase significantly.

The demand for Ni and Co may even surpass the worldwide production capacity. Co is particularly critical as it is only produced as a by-product of the Ni and Cu industry today. The nickel market is significantly larger than the cobalt market. Most of the Ni goes to the production of stainless steel, where the purity of Ni is less important. High purity Ni and high purity Co metals or compounds are however already in short supply. In view of the above, recovering Ni and Co from spent Li-ion batteries or their waste is therefore an attractive proposal, which is also known as circular economy for batteries.

In particular, so-called "Black Mass" (BM) or "Black Matter" is a very interesting starting material for recycling. While the expression Black Mass is frequently used in industry, the exact composition may vary significantly, depending on producer or application. Typically, end-of-life batteries are dismantled and shredded, which may include separation of casing materials, foils and/or anodes. Sometimes they are also pre-processed. Black Mass resulting from such processes is usually characterized by a relatively low aluminium content, as compared to the treatment of complete batteries. On the other hand, it contains rather high amounts of lithium, manganese, cobalt and/or nickel.

Facilities for recycling batteries and battery waste often use hydro-metallurgical processes for the treatment of Black Mass, resulting in salts or metal hydroxides. Pyrometallurgical refining processes are less common, whereas combined pyro-hydro processes as according to the present invention are still a rare exception.

Known pyrometallurgical processes for recycling Li-ion batteries reduce nickel, cobalt and copper oxides in a furnace to their respective metals, and concentrate them in an alloy phase at high temperature. Other compounds, such as lithium and manganese, oxidize to $Li_2O$ and MnO, and report to the slag.

Running such high temperature processes leads to wear or corrosion of the furnace walls over time. Typically, furnace walls are made of refractory bricks. The most commonly used bricks are based on magnesia. Typical magnesia bricks contain more than 90% of magnesia, while magnesia-chrome bricks contain 50 to 70%. It has been observed that magnesia is dissolved by common slags during operation of the furnace. This wear or corrosion is a recurring problem, resulting in high maintenance costs, as the furnace needs to be shut down and the refractory bricks need to be replaced at regular intervals. The problem is even more pronounced at higher operating temperatures, such as for example above 1550° C.

It is therefore an aim of the present invention, not only to provide an efficient process for the recovery of Ni and Co from Li-ion batteries or their waste, in particular from Black Mass, but also to increase the lifetime of the furnace. This is achieved by operating with a dedicated MnO- and $Li_2O$-rich slag system, having a controlled composition designed to limit the corrosion of magnesia-bearing refractory bricks.

WO2017121663 describes slag compositions produced in an industrial process and discloses effects of MnO on slag viscosity and cobalt recovery. The main slag components described therein are CaO, $SiO_2$, $Al_2O_3$, $Li_2O$, and MnO or $MnO_2$. Disclosed MnO concentrations in those slags are very low and the teaching is to limit the amount of MnO in the slag.

Wittkowski et al. (Speciation of Manganese in a Synthetic Recycling Slag Relevant for Lithium Recycling from Lithium-Ion Batteries: Metals, vol. 11 (2), 2021, p. 188.) analyse the phase composition of different Li-containing slags related to the recycling of Li-ion batteries. Black Mass is not mentioned as starting material. All reported slags are characterized by MnO contents well below those according to the present invention.

More recent Li-ion batteries, on the other hand, typically contain an increasing amount of Mn. This leads to slag compositions with a higher MnO content.

WO12140951, WO13080266 and WO20013294 propose processes to recycle Li-ion battery scrap to recover Ni and Co, while fixing impurities such as Fe and P in the slag phase. Although stating that Mn could be a component of the obtained slag, a preferred range or a particular effect of MnO in such slags is not specified.

CN103924088 and EP3269832 describe bath smelting processes for waste batteries, producing a Co and/or Ni containing alloy and a $SiO_2$ and MnO-rich slag. The content of Li in such slags is not mentioned, nor is any effect of MnO or $Li_2O$. Black Mass is not mentioned as starting material.

CN105838895 and Xiao et al. (Recovery of Valuable Metals from Spent Lithium-Ion Batteries by Smelting Reduction Process Based on $MnO—SiO_2—Al_2O_3$ Slag System: J. Sustain. Metall., vol. 3, 2017, pp. 703-710) describe compositions of slag produced by smelting Li-ion batteries and leaching processes to extract Li and Mn from the resulting slags. What has been disclosed is a method for extracting lithium and manganese from lithium-containing manganese-rich slag, while specific slag properties are not discussed. Typical slags are rich in MnO, $SiO_2$ and $Al_2O_3$, while the content of $Li_2O$ is quite low in all given examples.

Vest et al. (Slag design for lithium recovery from spent batteries: Int. Work. Met. Interact., vol. 9 (93), 2010, pp. 93-106.) describe theoretical calculations of different slag systems, of which some are also MnO-rich. However regarding lithium the goal is to design a slag in order to shift the Li distribution towards maximum concentrations in the flue dust, rather than to the slag. Consequently, one of the desired slag characteristics is to have a low capacity/solubility for $Li_2O$.

EP21176046 describes a pyrometallurgical recycling process for Li-ion battery in which batteries are fed into a smelting furnace equipped with means for submerged injection of $O_2$-bearing gas to reduce the majority of Ni and Co. Obtained slags are treated in a second reducing smelting step, in which residual Ni and Co are extracted. The slags contain less than 20% of MnO, and have higher amounts of $Al_2O_3$, such as above 20% or even above 30%. Wear or corrosion of furnace walls is not mentioned.

The present invention achieves a significant wear reduction of magnesia-bearing refractory bricks in pyrometallurgical processes, which contributes to the overall economy of the present process. The following embodiments further describe the invention.

According to a first embodiment, the process for the recovery of Ni and Co from Li-ion batteries or their waste, comprises the steps:
 providing a furnace lined with magnesia-bearing refractory bricks;
 providing a charge comprising slag formers and Li-ion batteries or their waste, wherein the content of Al in the charge is less than 8%; and,
 smelting the charge in reducing conditions, thereby obtaining an alloy containing the major part of the Ni and Co, and a Li-containing slag, wherein the slag has a percent composition by mass according to:
 25%<MnO<70%;
 $Al_2O_3$+0.5 MnO<45%;
 $SiO_2$>5%;
 $Li_2O$>1%;
 MnO+$Li_2O$+$Al_2O_3$+CaO+$SiO_2$+FeO+MgO+$P_2O_5$>90%; and,
 wherein (CaO+2 $Li_2O$+0.4 MnO)/$SiO_2$≥2.0.

By "slag formers" are meant: one or more of for example CaO, $Al_2O_3$ and $SiO_2$. Other slag formers, well known to the skilled person, may also be present. The slag forming compounds may be added as such, or they may be obtained in situ from easily oxidized metals present in the charge, such as aluminium.

By "furnace lined with magnesia-bearing refractory bricks" is meant a metallurgical furnace that is at least partially lined with such bricks, and in particular in the region in contact with the slag.

While the process is suitable for treating Li-ion batteries or their waste, other materials could also be included in the metallurgical charge. Mixed hydroxide precipitate (MHP) could for example be added: such products often contain useful concentrations of Co, Ni, and Mn, along with Mg. Co and Ni is recovered in the alloy, while Mn and Mg report to the slag where they play a useful role in protecting the lining. Combining battery materials with MHP also optimizes the total energy consumption as batteries tend to be exothermic while MHP is endothermic during smelting. The total charge could advantageously contain up to 30% by weight of MHP.

Except for MHP, the compounds not originating from Li-ion batteries or their waste should preferably be limited to less than 25%, more preferably to less than 15%, in the total charge.

According to a further embodiment, the Li-ion batteries or their waste is Black Mass.

The expression "Black Mass" is typically used in industry to describe an intermediate product originating from Li-ion batteries or their waste, such as new or waste Li-ion batteries, spent or end-of-life batteries, production or battery scrap, electrode materials or other pre-processed battery materials. The batteries are usually dismantled. This way, for example, Al, Fe, and Cu from casing and cabling are separated. All these battery materials are then shredded, sometimes pre-processed, for example by heat treatment to remove remaining electrolyte or graphite, resulting in a powder or filter cake, which can be further processed to briquets or pellets. In the latter case, this may comprise mixing with other compounds, not originating from Li-ion batteries or their waste, to produce those briquets or pellets.

The Black Mass should still contain appreciable amounts of Co and/or Ni to make the pyrometallurgical process economically interesting. The above-mentioned characteristics make Black Mass a preferred feed material for the described process.

By "major part" of an element or compound is meant: more than 50% by weight of the corresponding amount present in the charge. It may also include a range with a lower value selected from 55%, 60%, 65%, 70% and 75%, and an upper value selected from 80%, 85%, 90%, 95% and 100%.

According to a further embodiment, the content of MnO in the slag is 30% or more, preferably 40% or more.

The content of MnO in the slag has a key role in the present invention. A minimum of around 10% of MnO in the slag is needed to observe the effect of suppressing MgO dissolution into the slag from magnesia-bearing refractory bricks lining the furnace. Having at least 25% of MnO in the slag fully shows the effect of suppressing MgO dissolution. Having at least 30% of MnO is the slag is preferred, at least 40% is more preferred. When starting from Black Mass as feed material in the process and using a minimum amount of slag formers to save costs and keep the slag volume low, the amount of MnO in the slag will typically be above 25%.

It is beneficial to combine a MnO content of 25-70% with a relatively small volume of slag, as this concurs to suppressing the MgO dissolution.

On the other hand, the addition of more fluxing agents, thereby increasing the overall volume of the slag and diluting the percentage of MnO to below 25%, gradually increases the amount of MgO dissolving from the refractory bricks and thus has a negative influence.

The upper limit of 70% MnO in the slag helps to keep the melting point of the slag sufficiently low.

The Mn in the slag is represented by "MnO". The exact oxidation state of Mn is not always well-defined in such slags. Manganese oxide ("MnO") may thus also correspond to a mixture of the mono oxide MnO with dioxide $MnO_2$. The share of MnO is assumed to be well above 95%, particularly under the chosen reducing reaction conditions.

MnO typically has a green color, while $MnO_2$ typically has a black-brown or black-grey color, leading to its name "manganese black". Only if the content of the mono-species is high enough, the green color will prevail.

According to a further embodiment, the content of $Al_2O_3$ in the slag is less than 30%. Too high amounts of $Al_2O_3$, such as more than 30% or even more than 40%, increase the melting point of the slag. Heating to higher temperatures is economically less interesting and increases refractory wear.

Black Mass typically adds only limited amounts of $Al_2O_3$ to the slag. This is a clear difference when starting from Black Mass instead of complete Li-ion batteries, which are typically Al-rich due to their casing.

A slag composition complying with the formula $Al_2O_3$+0.5 MnO<45% allows for slags with a relatively high MnO content, while limiting the amount of $Al_2O_3$.

According to a preferred embodiment, the slag has a percent composition by mass according to $Al_2O_3$+0.5 MnO<30%. In this way, the amount of $Al_2O_3$ is further limited in slags with a relatively high MnO content, which is beneficial for protecting the magnesia-bearing refractory bricks.

According to a further embodiment, the content of CaO in the slag is 40% or less, preferably 30% or less.

CaO helps to keep the slag sufficiently fluid and ensures that it can be easily handled. CaO also helps to suppress the dissolution of MgO from the magnesia-bearing refractory bricks, as Ca and Mg share similar chemical sites in the slag. Operating the process with a preferred upper limit of 30% CaO helps to keep the melting point of the slag below 1600° C. However, a too high amount of CaO, such as above 40%, increases the melting point of the slag and thus should be avoided.

On the other hand, an increasing amount of MnO allows for reducing the amount of CaO, due to their similarity with regards to suppressing the dissolution of MgO from the magnesia-bearing refractory bricks.

According to a further embodiment, the slag formers contain no CaO.

A MnO-rich feed even allows for avoiding CaO as slag former completely. This opens the way for exploring other slag systems than the well-known ternary slag system $Al_2O_3$—CaO—$SiO_2$, which is typically used in the prior art.

According to a further embodiment, the content of $Li_2O$ in the slag is 3% or more, preferably 6% or more.

It has further been observed that in addition to MnO and CaO, $Li_2O$ also suppresses the dissolution of Mg from the magnesia-bearing refractory bricks. When recycling Li-ion batteries, the amount of $Li_2O$ in the slag is expected to be significant.

$SiO_2$ is contributing to lower the melting point of the slag. On the other hand, increasing amounts of $SiO_2$ have a negative effect. Therefore, according to a further embodiment, the amount of $SiO_2$ in the slag is less than 20%.

In a preferred embodiment, the slag composition is complying with the formula $(CaO+2\,Li_2O+0.4\,MnO)/SiO_2 \geq 2.0$.

According to a further embodiment, the content of cobalt oxide in the slag is 0.05%<CoO<1%.

Under the applied process conditions, the major part of cobalt reports to the alloy, while only a minor part remains in the slag. Typically, concentrations of less than 1% are obtained. Completely cobalt-free slags are not obtained in industrial Li-ion battery recycling.

According to a further embodiment, the content of Fe in the slag is 25% or less, preferably 10% or less. In an FeO-rich slag containing more than 10% FeO, respectively containing even more than 25% FeO, CoO cannot be reduced to metallic Co without also transferring relatively large quantities of metallic Fe to the alloy phase. This significantly increases the costs of any hydrometallurgical follow-up treatment of the resulting alloy and is thus less desired. Moreover, Fe-containing slags at high temperatures are aggressive to magnesia-bearing refractory bricks.

Therefore, according to a preferred embodiment, the content of Fe in the charge is 5% or less. This can, for example, be achieved by separation of Fe-containing casing materials, or by keeping the amount of unwanted lithium iron phosphate (LFP) batteries in the charge sufficiently low.

According to a further embodiment, the content of $P_2O_5$ in the slag is 0.5%<$P_2O_5$<10%.

Phosphorus typically originates from electrolytes in the Li-ion batteries and reports to the slag as $P_2O_5$.

Lithium iron phosphate (LFP) batteries typically contain more phosphorous than NMC batteries, but no cobalt and nickel. In an industrial setup, recyclers may have to deal with charges that contain such LFP batteries mixed with NMC batteries, which would contribute to the overall content of phosphorus in the slag.

Slag composition and operating temperature are critical considerations for the process described herein. The present invention achieves a balance between compounds that protect the furnace walls (e.g. MnO, CaO, $Li_2O$), and compounds that negatively impact the furnace walls. The slag composition domain moreover allows for a suitable fluidity of the slag and minimal overheating of the slag at the desired operating temperature. A temperature as low as possible is preferred, while still remaining above the melting point of the alloy.

This balance is reflected in the presented process conditions as well as in the composition of the slag itself.

According to a further embodiment, the step of smelting the charge is performed at a temperature of at least 1400° C., to ensure complete melting of the metallurgical charge, and at most 300° C. above the liquidus point of the slag, preferably at most 100° C. above the liquidus point of the slag. The lower limit is preferred to avoid even partial solidification of the produced alloy or slag. The upper limit is preferred to avoid overheating the slag. Higher temperatures promote the dissolution of Mg from the magnesia-bearing refractory bricks. Therefore, lower temperatures are generally preferred for wear-reduction as well as to save energy. Overheating the slag has a negative impact on the dissolution of magnesia-bearing refractory bricks by the slag.

The preferred operating temperature is below 1700° C., more preferably below 1650° C., even more preferably below 1600° C., and most preferably below 1550° C.

According to a further embodiment, the smelting step comprises the further steps:
- sampling the slag;
- cooling down the slag sample and assessing its color; and,
- in case the slag sample is green, terminating the smelting step; or,
- in case the slag sample is not green, proceeding with the smelting step after adjusting the $pO_2$-level to achieve more reducing conditions.

By "sampling the slag" is meant to take a small sample of the slag while the process continues under the chosen conditions.

The assessment of the color can easily be performed visually. Compared to a chemical analysis of the slag, monitoring the change of color provides for a quick and efficient indication that the slag contains a certain minimum percentage of MnO. As will be described in greater detail below, it has further been observed that the green color of the slag also indicates that the major part of Co contained in the feed is reduced, reporting to the alloy. Without being bound by theory, it is indeed believed that the change of color to green results from the reduction of $MnO_2$ to MnO, but also from the reduction of typically darker oxides of, for example, Fe, Ni and Co.

The visual inspection is a quick and easy way to steer the process, which can save time and operational costs.

In the present context, "green" is defined as the color with Hue, Lightness, and Chroma in the following range according to the ASTM D1535-14 (2018) standard:
- Hue from 5GY to 5BG;
- Lightness: ≥3; and,
- Chroma: ≥3.

Examples of green color are shown in "Geological Rock-Color Chart with Genuine Munsell Color Chips" produced by Munsell Color in 2009.

The operating conditions are chosen to oxidize a major part of Mn to the slag and to reduce the major part of Co and Ni to the alloy. Preferably more than 90% of Co and Ni are collected in the alloy, more preferred more than 95%, and most preferred more than 98%. The $pO_2$-level of the present process is easily adjusted to reach these favourable yields.

According to a further embodiment, the $pO_2$-level is adjusted to $10^{-7}>pO_2>10^{-12}$, preferably to $pO_2<10^{-8}$, more preferred to $pO_2<10^{-8.5}$, and most preferred to $pO_2<10^{-9}$.

The preferred $pO_2$-levels of $10^{-8}$, $10^{-8.5}$ and $10^{-9}$, as well as the limit of $10^{-12}$ indeed represent more reducing conditions as compared to a $pO_2$-level of $10^{-7}$ and favor high reduction yields.

According to a further embodiment, the color of the slag is green. During smelting the charge in reducing conditions, the color of the slag typically changes from black-grey or black-brown to green as the process progresses.

According to a further embodiment, the furnace is an electric furnace. Using an electrical furnace or electric arc furnace (EAF) allows for more flexibility in case higher operating temperatures are desired or needed. Another advantage is that it allows to profit from of off-peak electricity pricing, or electricity produced by eco-friendly green sources, such as local wind power plants.

A further embodiment describes a Li-containing metallurgical slag having a percent composition by weight according to:
25%<MnO<70%;
$Al_2O_3$+0.5 MnO<45%
$SiO_2$>5%;
$Li_2O$>3%; and,
MnO+$Li_2O$+$Al_2O_3$+CaO+$SiO_2$+FeO+MgO+$P_2O_5$>90%; and,
wherein (CaO+2 $Li_2O$+0.4 MnO)/$SiO_2$≥2.0.

A further embodiment describes a Li-containing metallurgical slag, wherein the color of the slag is green. The green color is an indication that the slag contains a certain minimum percentage of MnO, which is important for the specific slag properties.

A further embodiment describes a Li-containing metallurgical slag, wherein the content of MnO in the slag is 30% or more, preferably 40% or more. Higher amounts are beneficial for protecting the furnace walls.

A further embodiment describes a Li-containing metallurgical slag, wherein the content of $Al_2O_3$ in the slag is less than 30%. Limiting the amount to less than 30% is beneficial for achieving a lower melting point.

A further embodiment describes a Li-containing metallurgical slag, wherein the content of CaO in the slag is 40% or less, preferably 30% or less. Slags with a relatively high amount of MnO, such as more than 40% or even more than 50%, allow for a low to very low amount of CaO. This includes slags without CaO.

The beneficial properties of the slag according to the invention to protect the furnace walls from wear or corrosion, respectively from dissolution of MgO from the magnesia-bearing refractory bricks, are maintained in all the above cases.

A further embodiment describes a Li-containing metallurgical slag, wherein the content of Fe in the slag is 25% or less, preferably 10% or less. Iron from the slag could transfer to an alloy when re-using the slag in new pyrometallurgical operations, which is not desired, as it makes any hydrometallurgical follow-up treatment of such an alloy more complicated and thus costly.

A further embodiment describes the use of the Li-containing metallurgical slag as slag former in a pyrometallurgical recycling process. The obtained metallurgical slag contains one or more of MnO, $Al_2O_3$, CaO and $SiO_2$, and thus can be used as slag former in new operations.

A further embodiment describes the use of the Li-containing metallurgical slag as slag former in the process according to the first embodiment, thereby partially or fully replacing slag formers in the step of providing a charge comprising slag formers.

Re-using the produced metallurgical slag in new operations allows for a greater flexibility in choosing operating conditions, such as the $pO_2$-level of the process. For example, when more oxidizing conditions are used, thereby sending more Co and/or Ni to the slag, these valuable metals would be recovered in a following operation cycle, where more reducing conditions could be used to recover more of the Co and/or Ni. A further embodiment describes therefore a Li-containing metallurgical slag, wherein the slag further contains cobalt.

When re-using this metallurgical slag as slag former in a new process cycle, it should be taken into account that incoming batteries or their waste may contain additional amounts of compounds such as Al, Mn or Li, which will end up in the slag after their oxidation. Consequently, the amounts of $Al_2O_3$, MnO or $Li_2O$ in the slag will increase. Especially $Al_2O_3$ has a direct influence on the melting point and therefore an accumulation in the slag needs to be monitored.

Due to incoming fresh compounds, the metallurgical slag according to the invention can only be re-used for a limited number of cycles. To decide whether the slag can continue to be reused, the slag composition should be analysed and compared with the composition specifications described herein. Bleeding and re-using at least part of the metallurgical slag, or diluting it with fresh slag formers, are viable long-term options.

As described above, the slag according to the invention helps to suppress the dissolution of MgO from the magnesia-bearing refractory bricks significantly. However, it cannot be avoided completely. This leads to another positive side effect when recycling the slag. Any MgO accumulated in the slag during previous smelting operations tends to suppress, in combination with MnO, $Li_2O$ and CaO, the further corrosion of the refractory bricks. This makes the re-use of the slag particularly attractive.

A further embodiment describes the use of the Li-containing metallurgical slag in a process for the recovery of lithium. A slag with a $Li_2O$-content of more than 3% allows for the valorization of the contained lithium, while higher amounts of $Li_2O$, such as more than 6% or even more than 8% are preferred. The recovery of lithium is particularly attractive in case the slag is repeatedly re-used, as $Li_2O$ accumulates in the slag with every new cycle, thereby readily reaching concentrations of more than 8%. Li-fuming is a preferred process for the recovery of lithium from such Li-containing metallurgical slags, as this process ensures high recovery rates.

A further embodiment describes the use of the Li-containing metallurgical slag in a process for the recovery of cobalt. Re-using the slag as slag former in a process according to the first embodiment, or in other battery recycling processes, allows for the recovery of residual cobalt. This is not only interesting for economic, but also for ecological reasons.

CoO in the slag should preferably be limited to less than 1%, more preferably to less than 0.5%. This reduces losses of this valuable metals, and prepares the slag for safe disposal in landfills, once it is no longer reused.

The following examples are provided to further illustrate embodiments of the present invention.

EXAMPLE 1

The dissolution of MgO from the walls of magnesia-bearing crucibles was measured, when using several different slag compositions. Various compounds contained in Li-ion batteries or their waste, respectively their oxides such as FeO, $Al_2O_3$, $Li_2O$, MnO, and $P_2O_5$ were melted together with CaO and $SiO_2$ as fluxing agents in a 1 L MgO crucible. The total weight of added oxides was 1000 g.

The crucibles were gradually heated at heating rate of 150° C./h using an induction furnace. When the slags were fully molten, crucibles were kept at temperatures of 1500 or 1650° C. After 2 h of heating, molten slags were taken out of the crucibles, and quenched with water. Table 1 lists the composition of the produced slags in this example.

TABLE 1

Composition of the produced slags

| Slag | Temp. ° C. | Composition (%) | | | | | | |
|---|---|---|---|---|---|---|---|---|
| | | $SiO_2$ | FeO | $Al_2O_3$ | CaO | $Li_2O$ | MgO | MnO | $P_2O_5$ |
| 1-1 | 1500 | 15.2 | 0.0 | 25.8 | 22.2 | 7.5 | 3.3 | 25.2 | 0.8 |
| 1-2 | 1500 | 19.8 | 1.0 | 17.3 | 10.4 | 11.9 | 3.0 | 34.5 | 2.0 |
| 1-3 | 1650 | 6.3 | 1.9 | 17.9 | 12.5 | 12.9 | 1.1 | 44.3 | 3.1 |
| 1-4 | 1650 | 6.8 | 2.7 | 18.9 | 11.3 | 2.8 | 1.4 | 51.7 | 4.3 |

MgO concentrations in above slags were relatively low (from 0.3% to 3.0%). This result indicates that a dissolution of MgO from the wall of the crucible was well-suppressed under the chosen conditions.

(CaO+2 $Li_2O$+0.4 MnO)/$SiO_2$ was 2.9 in slag 1-1, 2.2 in slag 1-2, 9.0 in slag 1-3 and 5.5 in slag 1-4.

The experiments were performed with slag compositions having no Ni, Co or Cu, since the amount of these metals in the final slags are typically very low and thus essentially do not influence the slag properties.

COMPARATIVE EXAMPLE 2

The dissolution of MgO from the walls of magnesia-bearing crucibles was measured, when using different slag compositions. Various compounds contained in Li-ion batteries or their waste, respectively their oxides such as FeO, $Al_2O_3$, $Li_2O$, MnO, and $P_2O_5$ were melted together with CaO and $SiO_2$ as fluxing agents, in a 1 L MgO crucible. The total weight of added oxides was 1000 g.

The crucibles were gradually heated at a heating rate of 150° C./h using an induction furnace. When the slags were fully molten, crucibles were kept at temperatures of 1500° C. for 2 h. After 2 h of heating, molten slags were taken out of the crucibles, and quenched with water. Table 2 lists the composition of the produced slags in this example.

TABLE 2

Composition of the produced slags

| Slag | Temp. ° C. | Composition (%) | | | | | | |
|---|---|---|---|---|---|---|---|---|
| | | $SiO_2$ | FeO | $Al_2O_3$ | CaO | $Li_2O$ | MgO | MnO | $P_2O_5$ |
| 2-1 | 1500 | 28.6 | 0.0 | 29.1 | 20.5 | 5.6 | 9.0 | 6.5 | 0.8 |
| 2-2 | 1500 | 31.6 | 0.0 | 22.6 | 15.8 | 9.0 | 15.7 | 4.5 | 0.8 |

Compared to the slags 1-1 to 1-4 used in Example 1, here the MnO content in the slags was adjusted to be lower than 10%. (CaO+2 $Li_2O$+0.4 MnO)/$SiO_2$ was 1.2 in slag 2-1 and 1.1 in slag 2-2. Measured MgO concentrations in above slags were relatively high (from 9.0% to 15.7%), which indicates that relatively large quantities of MgO from the crucibles were dissolved in the respective slags. As in Example 1, the slags contained no Ni, Co or Cu.

DISCUSSION OF EXAMPLES 1 AND 2

The slags obtained in Example 1 contained less MgO than the slags obtained in Comparative Example 2. No visible degradation of the MgO crucible was observed under the conditions of Example 1, whereas the crucible walls became thinner under the conditions of Comparative Example 2. Slags containing relatively high concentrations of MnO suppressed the MgO dissolution, as demonstrated in Example 1. More specifically, the MgO dissolution into the slag was efficiently suppressed when the MnO concentration was 25% or higher.

EXAMPLE 3

500 kg of Black Mass was fed to a furnace with a diameter of 1 m, freshly lined with 200 mm chrome-magnesia refractory bricks. 40 kg of limestone and 20 kg of sand were added together with the Black Mass. A bath temperature of 1500-1550° C. was maintained, which is suitable to maintain both the slag and the alloy sufficiently fluid for easy tapping and handling. The heat was supplied by the oxidation of Al and C in the Black Mass, using submerged $O_2$ injection. The injection rate was chosen to guarantee strongly reducing conditions, i.e. $pO_2$ of $10^{-9}$. Natural gas was added to compensate for heat losses in the furnace. After 1 h of heating, the produced alloy and slag were separated by tapping. Table 3 shows the analyses of the input and output phases of the process. During processing, small quantities of materials were captured as fume. Table 3 shows the complete material balance.

TABLE 3

Input and output phases of the process

| | Mass (kg) | Composition (%) | | | | | | | | | | | |
|---|---|---|---|---|---|---|---|---|---|---|---|---|---|
| | | Ni | Co | Cu | Fe | $SiO_2$ | CaO | Al ($Al_2O_3$) | Li ($Li_2O$) | Mn (MnO) | P ($P_2O_5$) | C | MgO |
| Input | | | | | | | | | | | | | |
| Black Mass | 500 | 16.5 | 5.6 | 0.8 | 0.2 | — | — | 3.0 | 2.5 | 5.7 | 0.1 | 48.0 | — |

TABLE 3-continued

Input and output phases of the process

| | Mass (kg) | Ni | Co | Cu | Fe | $SiO_2$ | CaO | Al ($Al_2O_3$) | Li ($Li_2O$) | Mn (MnO) | P ($P_2O_5$) | C | MgO |
|---|---|---|---|---|---|---|---|---|---|---|---|---|---|
| Limestone | 40 | — | — | — | — | 4.8 | 53.3 | — | — | — | — | 11.4 | — |
| Silica | 20 | — | — | — | — | 100 | — | — | — | — | — | — | — |
| Output |
| Alloy | 119 | 69.1 | 23.2 | 3.3 | 0.8 | — | — | — | — | 3.4 | 0.2 | — | — |
| Slag | 128 | 0.1 | 0.3 | 0.1 | 0.2 | 17.0 | 16.5 | (21.9) | (16.5) | (24.2) | (0.9) | — | 2.3 |

During processing Black Mass, no visible degradation of the magnesia-bearing refractory bricks was observed. Concentration of MgO in the obtained slag was only 2.3%, equivalent to 2.9 kg loss of MgO from the refractory bricks, which is considered low. This slag thus efficiently suppressed the wear of the furnace walls.

EXAMPLE 4

500 kg of Black Mass was fed to a furnace with a diameter of 1 m, freshly lined with 200 mm chrome-magnesia refractory bricks. 135 kg of the slag produced in Example 3 was added together with the Li-ion batteries. A bath temperature of 1500-1550° C. was maintained, which is suitable to maintain both the slag and the alloy sufficiently fluid for easy tapping and handling. The heat was supplied by the oxidation of Al and C in the batteries, using submerged $O_2$ injection. The injection rate was chosen to achieve strongly reducing conditions, i.e. in this case a $pO_2$ of $10^{-9}$. Natural gas was added to compensate for heat losses in the furnace. After 1 h of heating, the produced alloy and slag were separated by tapping. Table 6 shows the analyses of the input and output phases of the process.

TABLE 4

Input and output phases of the process

| | Mass (kg) | Ni | Co | Cu | Fe | $SiO_2$ | CaO | Al ($Al_2O_3$) | Li ($Li_2O$) | Mn (MnO) | P ($P_2O_5$) | C | MgO |
|---|---|---|---|---|---|---|---|---|---|---|---|---|---|
| Input |
| Black Mass 2 | 500 | 16.5 | 5.6 | 0.8 | 0.2 | — | — | 3 | 2.5 | 5.7 | 0.1 | 48.0 | — |
| Slag former | 128 | 0.1 | 0.3 | 0.1 | 0.2 | 17.0 | 16.5 | (21.9) | (16.5) | (24.2) | (0.9) | — | 0.1 |
| Output |
| Alloy | 119 | 69.1 | 23.2 | 3.2 | 0.9 | — | — | — | — | 3.6 | 0.3 | — | — |
| Slag | 208 | 0.1 | 0.3 | 0.1 | 0.2 | 10.4 | 10.0 | (26.8) | (20.1) | (29.4) | (0.9) | — | 1.4 |

During processing batteries, no visible degradation of the magnesia-bearing refractory bricks was observed. Concentration of MgO in the produced slag was only 1.4%, equivalent to 0.1 kg loss of MgO from the refractory bricks, which is an even smaller degradation than in Example 3, thanks to higher MnO content in the slag. This slag thus efficiently suppressed the wear of the furnace wall made of magnesia-bearing refractory bricks.

GENERAL CONCLUSION

Metallurgical slags according to the present invention are suitable to recover valuable metals, such as Ni and Co, from Li-ion batteries or their waste, while minimizing degradation of the magnesia-bearing refractory bricks of the furnace.

The invention claimed is:

1. Process for the recovery of Ni and Co from Li-ion batteries or their waste, comprising the steps:
   providing a furnace lined with magnesia-bearing refractory bricks;
   providing a charge comprising slag formers and Li-ion batteries or their waste, wherein the content of Al in the charge is less than 8%; and,
   smelting the charge in reducing conditions, thereby obtaining an alloy containing the major part of the Ni and Co, and a Li-containing slag, wherein the slag has a percent composition by weight according to:
   25%<MnO<70%;
   $Al_2O_3$+0.5 MnO<45%
   $SiO_2$>5%;
   $Li_2O$>1%;
   MnO+$Li_2O$+$Al_2O_3$+CaO+$SiO_2$+FeO+MgO+$P_2O_5$>90%; and,
   wherein (CaO+2 $Li_2O$+0.4 MnO)/$SiO_2$≥2.0.

2. Process according to claim 1, wherein the content of MnO in the slag is 30% or more.

3. Process according to claim 1 or 2, wherein the content of $Al_2O_3$ in the slag is less than 30%.

4. Process according to claim 1, wherein $Al_2O_3$+0.5 MnO<30%.

5. Process according to claim 1, wherein the Li-ion batteries or their waste is Black Mass.

6. Process according to claim 1, wherein the content of CaO in the slag is 40% or less.

7. Process according to claim 1, wherein the slag formers contain no CaO.

8. Process according to claim 1, wherein the content of $Li_2O$ in the slag is 3% or more.

9. Process according to claim 1, wherein the content of cobalt oxide in the slag is 0.05%<CoO<1%.

10. Process according to claim 1, wherein the content of Fe in the slag is 25% or less.

11. Process according to claim 1, wherein the content of Fe in the charge is 5% or less.

12. Process according to claim 1, wherein the content of $P_2O_5$ in the slag is 0.5%<$P_2O_5$<10%.

13. Process according to claim 1, wherein the step of smelting the charge is performed at a temperature of at least 1400° C. and at most 300° C. above the liquidus point of the slag, thereby avoiding overheating.

14. Process according to claim 1, the smelting step comprising the further steps:
    sampling the slag;
    cooling down the slag sample and assessing its color; and,
    in case the slag sample is green, terminating the smelting step; or,
    in case the slag sample is not green, proceeding with the smelting step after adjusting the $pO_2$-level to achieve more reducing conditions.

15. Process according to claim 1, wherein the $pO_2$-level is adjusted to $10^{-7}$>$pO_2$>$10^{-12}$.

16. Process according to claim 14, wherein the color of the slag is green.

17. Process according to claim 1, wherein the furnace is an electric furnace.

18. Li-containing metallurgical slag having a percent composition by weight according to:
    25%<MnO<70%;
    $Al_2O_3$+0.5 MnO<45%
    $SiO_2$>5%;
    $Li_2O$>3%;
    MnO+$Li_2O$+$Al_2O_3$+CaO+$SiO_2$+FeO+MgO+$P_2O_5$>90%; and,
    wherein (CaO+2 $Li_2O$+0.4 MnO)/$SiO_2$≥2.0.

19. Li-containing metallurgical slag according to claim 18, wherein the color of the slag is green.

20. Li-containing metallurgical slag according to claim 18 or 19, wherein the content of MnO in the slag is 30% or more.

21. Li-containing metallurgical slag according to claim 18, wherein the content of $Al_2O_3$ in the slag is less than 30%.

22. Li-containing metallurgical slag according to claim 18, wherein the content of CaO in the slag is 40% or less.

23. Li-containing metallurgical slag according to claim 18, wherein the content of Fe in the slag is 25% or less.

24. Slag former in a pyrometallurgical recycling process comprising the Li-containing metallurgical slag according to claim 18.

25. The process according to claim 1, wherein the slag former comprises a Li-containing metallurgical slag having a percent composition by weight according to:
    25%<MnO<70%;
    $Al_2O_3$+0.5 MnO<45%
    $SiO_2$>5%;
    $Li_2O$>3%;
    MnO+$Li_2O$+$Al_2O_3$+CaO+$SiO_2$+FeO+MgO+$P_2O_5$>90%; and,
    wherein (CaO+2 $Li_2O$+0.4 MnO)/SiO2≥2.0.

26. Li-containing metallurgical slag according to claim 18, wherein the slag further contains cobalt.

\* \* \* \* \*